US010572150B2

(12) United States Patent
Li et al.

(10) Patent No.: US 10,572,150 B2
(45) Date of Patent: Feb. 25, 2020

(54) MEMORY NETWORK WITH MEMORY NODES CONTROLLING MEMORY ACCESSES IN THE MEMORY NETWORK

(71) Applicant: HEWLETT PACKARD ENTERPRISE DEVELOPMENT LP, Houston, TX (US)

(72) Inventors: Sheng Li, Palo Alto, CA (US); Norman Paul Jouppi, Palo Alto, CA (US); Paolo Faraboschi, Palo Alto, CA (US); Michael R. Krause, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 716 days.

(21) Appl. No.: 14/784,245

(22) PCT Filed: Apr. 30, 2013

(86) PCT No.: PCT/US2013/038937
§ 371 (c)(1),
(2) Date: Oct. 13, 2015

(87) PCT Pub. No.: WO2014/178856
PCT Pub. Date: Nov. 6, 2014

(65) Prior Publication Data
US 2016/0034195 A1    Feb. 4, 2016

(51) Int. Cl.
*G06F 12/00*    (2006.01)
*G06F 3/06*    (2006.01)
(Continued)

(52) U.S. Cl.
CPC .......... *G06F 3/0604* (2013.01); *G06F 3/0635* (2013.01); *G06F 3/0659* (2013.01);
(Continued)

(58) Field of Classification Search
CPC .... G06F 3/061; G06F 3/0611; G06F 11/2066; G06F 11/2069; G06F 11/2064;
(Continued)

(56) References Cited

U.S. PATENT DOCUMENTS 4,901,226 A * 2/1990 Barlow ................... G06F 13/37
710/122
7,546,486 B2   6/2009 Slik et al.
(Continued)

FOREIGN PATENT DOCUMENTS

CN    102378971    3/2012
CN    102713827    10/2012
(Continued)

OTHER PUBLICATIONS

Extended European Search Report dated Dec. 15, 2016 for EP application No. 13883839.6; pp. 7.
(Continued)

*Primary Examiner* — Mardochee Chery
(74) *Attorney, Agent, or Firm* — Hewlett Packard Enterprise Patent Department

(57) ABSTRACT

According to an example, a memory network includes memory nodes. The memory nodes may each include memory and control logic. The control logic may operate the memory node as a destination for a memory access invoked by a processor connected to the memory network and may operate the memory node as a router to route data or memory access commands to a destination in the memory network.

7 Claims, 4 Drawing Sheets

(51) Int. Cl.
  *G06F 13/38* (2006.01)
  *G06F 12/08* (2016.01)
  *G06F 11/20* (2006.01)
  *G06F 11/34* (2006.01)
  *G06F 12/0811* (2016.01)

(52) U.S. Cl.
  CPC ............ G06F 3/0683 (2013.01); G06F 12/08 (2013.01); G06F 13/382 (2013.01); *G06F 3/061* (2013.01); *G06F 3/0611* (2013.01); *G06F 11/2064* (2013.01); *G06F 11/2066* (2013.01); *G06F 11/2069* (2013.01); *G06F 11/2074* (2013.01); *G06F 11/2082* (2013.01); *G06F 11/3419* (2013.01); *G06F 11/3457* (2013.01); *G06F 11/3485* (2013.01); *G06F 12/0811* (2013.01); *G06F 2212/1016* (2013.01); *G06F 2212/254* (2013.01)

(58) Field of Classification Search
  CPC ............ G06F 11/2074; G06F 11/2082; G06F 11/3419; G06F 11/3457; G06F 11/3485; G06F 12/0811
  USPC ......................................................... 711/117
  See application file for complete search history.

(56) References Cited

U.S. PATENT DOCUMENTS

| | | | |
|---|---|---|---|
| 8,397,011 B2 | 3/2013 | Ashwood | |
| 8,417,873 B1 | 4/2013 | Karamcheti | |
| 9,432,298 B1* | 8/2016 | Smith | ................ H04L 49/9057 |
| 2004/0030859 A1 | 2/2004 | Doerr et al. | |
| 2006/0224804 A1* | 10/2006 | Alexandre | ............ G06F 13/161 |
| | | | 710/110 |
| 2007/0201434 A1 | 8/2007 | Nakamura et al. | |
| 2007/0233976 A1 | 10/2007 | Mori et al. | |
| 2010/0191894 A1 | 7/2010 | Bartley et al. | |
| 2010/0251005 A1 | 9/2010 | Kitano | |
| 2011/0055156 A1 | 3/2011 | Roberts et al. | |
| 2012/0166891 A1 | 6/2012 | Dahlen | |
| 2012/0185618 A1 | 7/2012 | Assarpour | |
| 2012/0221785 A1 | 8/2012 | Chung et al. | |
| 2012/0324159 A1 | 12/2012 | Bopardikar et al. | |
| 2012/0330908 A1 | 12/2012 | Stowe et al. | |

FOREIGN PATENT DOCUMENTS

| | | |
|---|---|---|
| CN | 104956349 | 9/2015 |
| EP | 1720104 A1 | 11/2006 |
| EP | 2239667 A2 | 10/2010 |

OTHER PUBLICATIONS

Greenberg, Albert, et al., "VL2: A Scalable and Flexible Data Center Network", Microsoft Research, Aug. 17-21, 2009, 12 Pages.

International Searching Authority, The International Search Report and the Written Opinion, dated Jan. 27, 2014, 12 Pages.

\* cited by examiner

MEMORY NETWORK WITH MEMORY NODES CONTROLLING MEMORY ACCESSES IN THE MEMORY NETWORK

CROSS-REFERENCE TO RELATED APPLICATIONS

The present application is related to patent application PCT/US13/38935 entitled "Memory Network to Route Memory Traffic and I/O Traffic" by Barron et al., and to patent application PCT/US13/38936 entitled "Memory Node Error Correction" by Li et al., both of which are filed concurrently with the present application and are assigned to the same assignee as the present application.

BACKGROUND

Computer networks and systems have become indispensable tools for modern business. Today terabytes of information on virtually every subject imaginable are stored and accessed across networks. Some applications, such as telecommunication network applications, mobile advertising, social media applications, etc., demand short response times for their data. As a result, new memory-based implementations of programs, such as in-memory databases, are being employed in an effort to provide the desired faster response times. These memory-intensive programs primarily rely on large amounts of directly addressable physical memory (e.g., random access memory) for storing terabytes of data rather than traditional hard drives to reduce response times.

BRIEF DESCRIPTION OF DRAWINGS

The embodiments are described in detail in the following description with reference to examples shown in the following figures.

DETAILED DESCRIPTION OF EMBODIMENTS

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

A memory network, according to an example, includes memory nodes that are connected via high-speed interconnects, such as high-speed point-to-point links. Each memory node may be a memory subsystem including a memory controller and memory to store data. The memory node may also include routing logic to route data or memory access commands to a destination, which may be another memory node in the memory network. The memory network may be a memory subsystem for processors. For example, main memory controllers for the processors may be connected to memory nodes in the memory network via point-to-point links. The main memory controllers may store data in the memory nodes of the memory network. Also, the processors may implement memory page management mechanisms to minimize latency for memory accesses. Thus, the memory network can act both as a scalable, high-performance memory pool and as a network for supporting data transmission between memory nodes in the memory network and between processors and the memory nodes.

The memory network facilitates memory capacity scalability and enables easy data sharing among systems connected to the memory network. To scale the memory network, additional memory nodes may be added to the memory network and connected to existing memory nodes for example via point-to-point links. The memory network, given its scalability can support large capacity and high bandwidth, big-data applications, such as in-memory databases. Also, the memory network can support heterogeneous memory technologies and dynamic link bandwidth by leveraging a decoupled memory interface. The decoupled memory interface may include a memory controller provided for each memory node.

Figure 1:
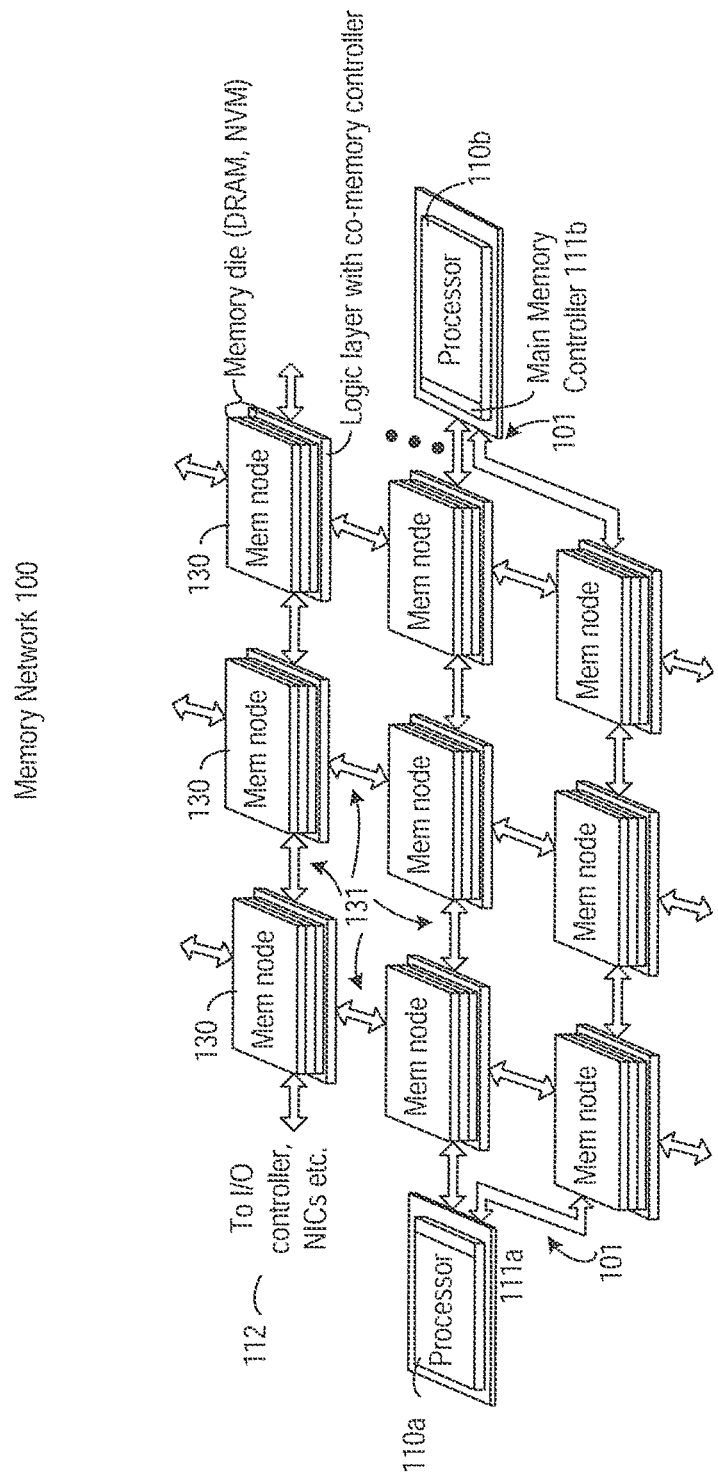
FIG. 1 illustrates a memory network.

FIG. 1 shows an example of a memory network 100. Processors 110a-b and main memory controllers 111a-b are connected to the memory network 100 for example using point-to-point links 101. A point-to-point link is a wire or other connection medium that links two circuits. In one example, a point-to-point link connects only two circuits which is unlike a shared bus or crossbar switches that connect more than two circuits or devices. A processor and main memory controller connected to the memory network 100, such as 110a and 111a or 110b and 111b, may be provided on the same chip, or may be provided on separate chips. Also, more or fewer processors, main memory controllers and memory nodes than shown in FIG. 1 may be used in the memory network 100. Also, any circuit 112 that may use memory, other than processors 110a-b, may be connected to the memory network 100. Each of the processors 110a-b runs an operating system (OS) that may execute page management mechanisms described below and perform other functions.

Inside the memory network 100, memory nodes 130 may also be connected together via point-to-point links 131, which are inter-node point-to-point links. Each memory node can operate as a destination of a memory access if the data to be accessed is stored at the memory node, and as a router that forwards a memory access command to its appropriate destination memory node if the data to be accessed is at a different memory node. For example, the main memory controllers 111a-b can send memory access commands, e.g., read, write, copy, etc., to the memory nodes 130 to perform memory accesses for the processors 110a-b. Each memory node receiving a command may execute the command if it is the destination or route the command to its destination memory node, as is further described below. The memory network 100 provides memory scalability through the point-to-point links 131 and through the ability to add memory nodes as needed, which satisfies the memory capacity requirements of big-data workloads. Scaling up memory capacity in the memory network 100 is as easy as cascading additional memory nodes. Moreover, since the memory capacity expansion in the memory network 100 is through memory channels, e.g., the point-to-point links 131, rather than dedicated I/O channels, it requires minimum modifications to the hardware and operating system.

Figure 2:
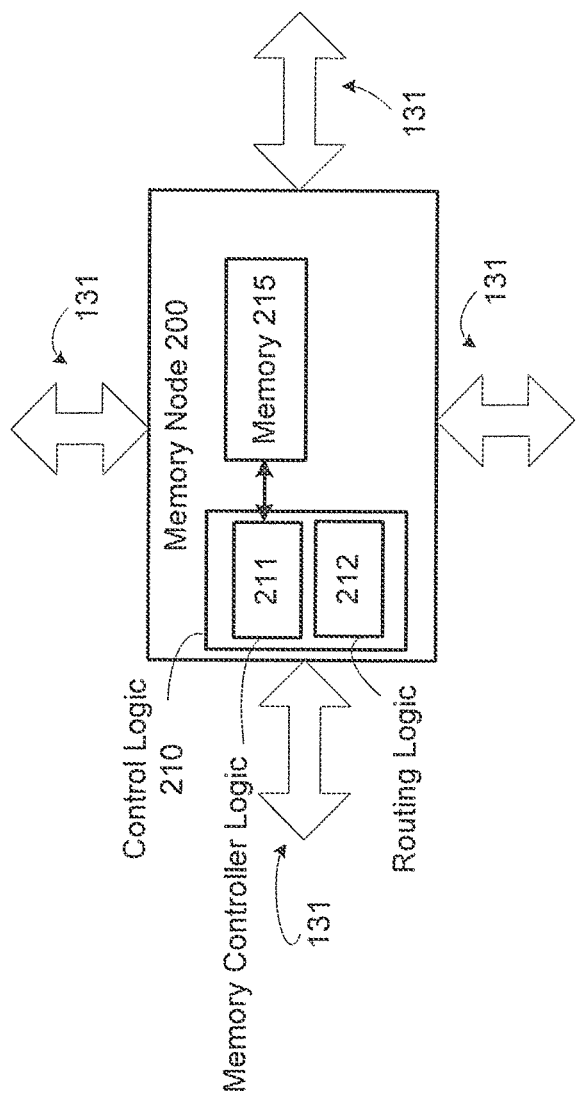
FIG. 2 illustrates a block diagram of a memory node.

FIG. 2 shows a block diagram of the memory node 200 which may represent any of the memory nodes 130 shown in FIG. 1. The memory node 200 includes control logic 210 and memory 215. The memory 215 may be dynamic random-access memory (DRAM) or any type of semiconductor memory that is volatile or nonvolatile. The control logic 210 may include memory controller logic 211 and routing logic 212. The memory controller logic 211 is also referred to as a co-located memory controller or a co-memory controller. The control logic 210 may include hardware and/or machine readable instructions stored on a storage medium and executable by hardware. The memory controller logic 211 and routing logic 212 may be implemented by two separate hardware circuits or the same circuit. The memory controller logic 211 performs the operations of a memory controller for the memory 215 including memory access operations. The routing logic 212 receives memory access commands, determines whether it is the destination, and sends the memory access commands to the memory controller logic 211 for execution if it is the destination. If the memory node is not the destination, the routing logic 212 sends the memory access commands to a next hop in the memory network toward the destination. Various routing protocols may be used for routing.

Figure 3:
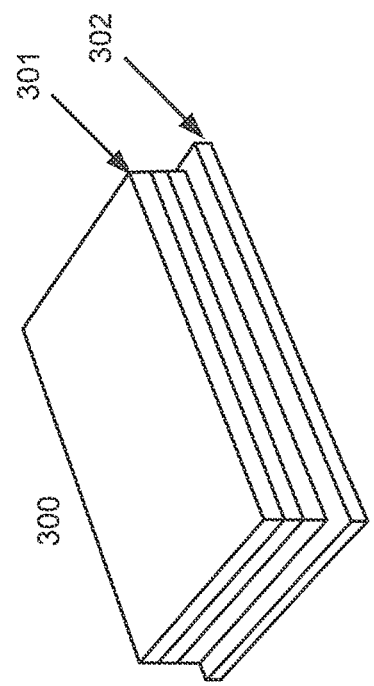
FIG. 3 illustrates a stacked memory node.

In one example, the memory node 200 may be a collection of multiple memory chips packaged in a single component, such as three-dimensional (3D) or 2.5D stacked dynamic random-access memory (DRAM). The memory network 100 may use stacked memory or any form of co-packaged memory. FIG. 3 shows an example of 3D stacked DRAM. For example, the 3D stacked DRAM 300 may include multiple layers of dense memory die 301 with a base logic layer 302. The 3D stacked DRAM 300 may include through silicon via (TSV) channels for transferring data from a DRAM in the memory die 301 to the base logic layer 302. The base logic layer 302 includes the control logic 210 shown in FIG. 1.

Figure 4:
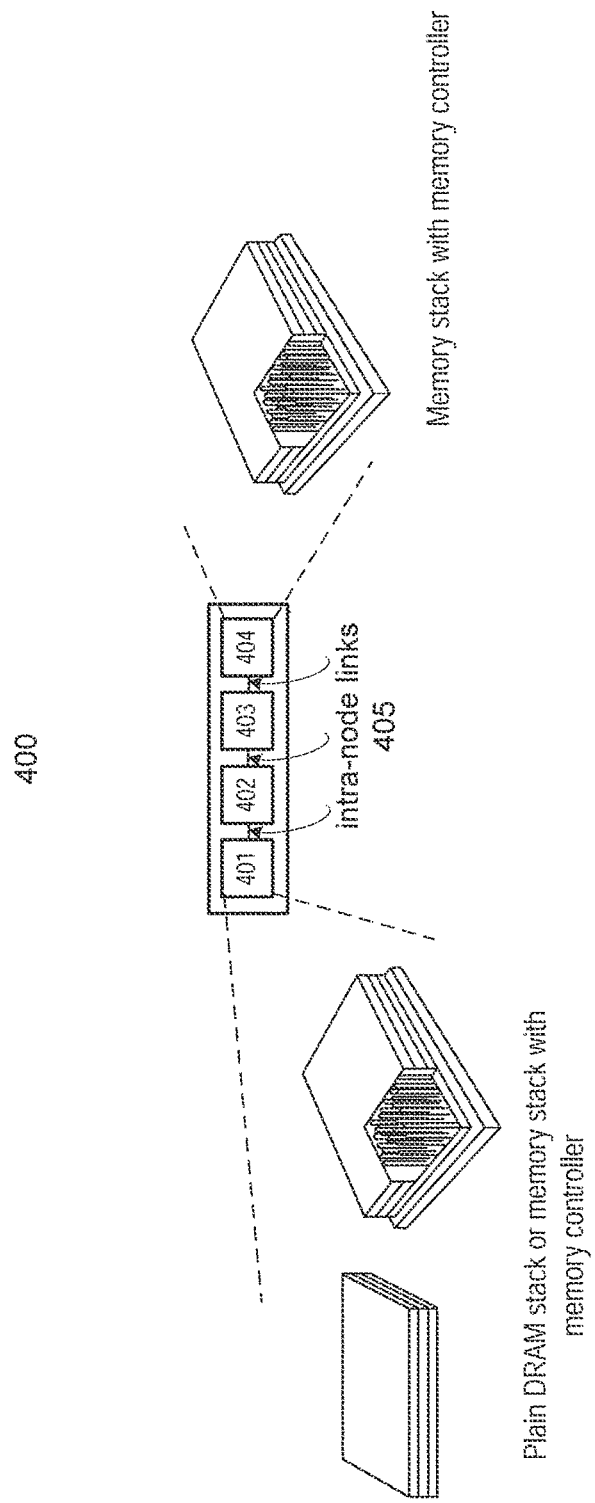
FIG. 4 illustrates a memory node with multiple stacked memories.

FIG. 3 shows a single-stack memory node example. In another example, the memory node 200 may include multiple memory stacks, and each memory stack is connected via intra-node links. For example, FIG. 4 shows a block diagram of a multi-stack memory node 400 that may be used as a memory node in the memory network 100. In this example, the memory node 400 includes memory stacks 401-404 but a memory node may have less than four or more than four memory stacks. At least one of the stacks has a memory-side co-memory controller. For example, stack 401 includes a base logic layer such as shown in FIG. 3. The base logic layer may include the control logic 210 that includes memory controller logic 211 and routing logic 212 of FIG. 2. The other stacks may or may not include control logic. For example, stack 404 is a plain DRAM stack without control logic and stack 403 has control logic. The stacks 401-404 are connected via intra-node links 405.

The memory network 100 is included in a hierarchy of memory subsystems. For example, an upper level of the hierarchy includes memory subsystems for the processors 110a-b, which may include the main memory controllers 111a-b and the memory nodes 130 operate as memory for main memory controllers 111a-b. A lower level of the hierarchy includes the memory subsystem in each memory node. FIGS. 2-4 show examples of memory subsystems for the memory nodes 130. Also, the topologies of the memory at all levels are flexible. Examples of topologies may include 2D mesh, torus, tree, etc. The memory network 100 is shown as a 2D mesh in FIG. 1 as an example.

A decoupled memory interface is used for the hierarchy of memory subsystems. A decoupled memory interface for example means that there is no single central memory controller for all the memory subsystems. Instead, the memory controllers are distributed, such as the main memory controllers 111a-b for the processors 110a-b and the memory controller logic 211 for each of the memory nodes 130 (i.e., the co-memory controllers). Also, memory access requests in the memory network 100 are asynchronous and non-deterministic in that the time a response is received for a memory access request may not be predetermined, such as due to the routing of a memory access request in the memory network. This is different than conventional memory systems where the controller typically expects a response to a memory access command in a certain number of cycles.

In the decoupled memory interface design employed by the hierarchical memory subsystems, the main memory controllers of the processors and the co-memory controllers of the memory nodes 130 use an abstracted protocol for communication. For example, the processor-side main memory controller (e.g., main memory controller 111a or 111b) is responsible for sending the high-level memory access commands such as read, write, and block copy, from the processor to the memory network 100 where it is routed to the destination memory node. The read, write, and block copy commands are much simpler than the conventional RAS/CAS (row/column-based) memory commands in that the processor-side main memory controller does not have to know the intimate details of the memory device architecture, nor control memory timings through detailed memory command sequences such as activation, precharge, etc.

At the memory nodes 130, the co-memory controllers decode packets to extract the memory access commands and enforce memory management mechanisms that may be implemented and the actual execution of the read, write, and block copy commands from local memory. For example, after receiving a read command from a main memory controller of a processor, the co-memory controller at the destination memory node fetches the data from local memory and notifies the main memory controller that the data is ready to get or directly sends a data packet with transaction ID and the requested data back to the source main memory controller. These mechanisms depend on the specific type of the memory technology employed in the node; for example, the memory-side co-memory controller for DRAM is different from the co-memory controller for a DRAM stack, for flash memory, or for other forms of non-volatile memory.

Both the processor-side main memory controllers and the memory node co-memory controllers are allowed to co-schedule memory requests to improve overall system performance. For example, the processor-side main memory controllers can tag memory requests with priority information to denote memory requests that must be returned as soon as possible or can be delayed without causing system performance degradation. The memory node co-memory controllers can reschedule the memory request according to the local memory device status (e.g., open row or close row status). When rescheduling, co-memory controllers at the memory nodes may limit rescheduling requests to requests within the same priority level to ensure memory requests with higher priorities are processed first regardless of the local memory device status.

The decoupled memory interface design significantly reduces the complexity of the processor-side memory controller for managing channels, ranks, and banks, and enables the large-scale memory network with high parallelism. Also, in the decoupled memory interface design, the co-memory controllers at the memory nodes can manage local memory autonomously, hide the media level details, and provide a highly abstract interface. For example, the memory node co-memory controllers can perform a refresh of DRAM locally without the involvement of the main memory controllers. Therefore, the decoupled memory interface can support heterogeneous memory technologies including non-volatile memory (NVM) and DRAM, and the co-memory controller in each memory node is in charge of the timing and signaling interface of the specific memory technology. Thus, the memory network 100 isolates media-specific control operations to the per memory module co-memory controller which reduces complexity while increasing performance in terms of latency and bandwidth.

In addition, the link bandwidth can be adjusted by negotiation between the main memory controllers and the memory node co-memory controllers to best leverage the available memory bandwidth according to the bandwidth requirements, of each memory technology and system configuration, and dynamically provisioned link bandwidth (e.g. by allocating different numbers of lanes for different links) can be implemented.

The memory network 100 has different paths and destinations for storing and retrieving data; this causes the accesses through the network to be served with different latencies. For example, multiple paths may exist between any source and destination. Processors connected to the memory network 100, such as processors 110a-b may classify the memory nodes 130 as near memory nodes or far memory nodes based on latency and/or distance (e.g., number of hops). To ensure high performance of the scalable memory network 100, page management mechanisms that provide trade-offs between simplicity and high-performance may be implemented.

In one example, global memory address space can be distributed across all memory nodes uniformly using cache block granularity or page level granularity. Then memory accesses route to appropriate memory nodes directly. For example, a global unified memory address space containing all the memory nodes 130 is used by all the processors connected to the memory network 100. In this way, no modification to the processor hardware or OS may be required, and the memory space may be expanded. If near and far memory is treated the same, it may cause performance degradation for workloads with large memory footprints because of the longer latency required for accessing far memory locations. When far memory regions are repeatedly accessed, performance degradation can become more severe.

Instead of treating near and far memory the same, the OS (or hypervisor, or application software) can intelligently map the hot memory pages (memory pages that are frequently accessed) in near memory and map the cold memory pages (memory pages that are seldom accessed) to far memory.

In another example of a page management mechanism that may be implemented, far memory is treated similarly to paging from secondary storage (such as hard disks). However in this case, both the near memory and far memory share the same physical memory address space. For example, the system could establish a convention by which the near and far memory addresses can be respectively allocated at the bottom and top of the memory address space. Each memory address in the memory address space is indicated as being near or far. For big-data workloads or other applications whose footprint exceeds the near memory capacity, page management can be performed to fetch and relocate the far memory page to the near memory.

An "in-remote-memory" page fault, signaled to the processor performing a memory access, may be used to bring a page to near memory if it is determined the requested page is not already in near memory and to trigger a page swap between near memory and far memory if needed. For example, if a page swap needs to be performed, an extra bit can be added to indicate an "in-remote-memory" page fault. Multiple bits can also be used to divide the memory space into multiple regions with different distances to the processor. An "in-remote-memory" page fault is different from a standard page fault as normally implemented by the virtual memory system of processors where the requested memory page is on a hard disk instead of in the memory network 100. On an "in-remote-memory" page fault, the OS may initiate a page swap operation between near and far memory region.

In order to maintain the memory consistency and coherence between the near memory and the far memory, each page table entry maintained by the OS includes a valid bit, a dirty bit, and an extra pending replace bit. The OS maintains a pending replacement page queue for the near memory region. When there is an "in-remote-memory" page fault, the pending replacement page queue is first checked to see if there is an existing entry for the far memory page. If there is, it indicates that the current page fault is a fault-after-fault, and thus the current "in-remote-memory" page fault is combined with the existing one. If there is not, then an entry from the near memory page table is chosen for replacement, and a new request is added to the pending replacement page queue. The OS may also maintain a least recently used (LRU) replacement (other replacement policies can be used as well) list for the near memory pages to select the victim for page-out replacement. The pending replacement bit in a page table entry is set once the corresponding page is selected as a replacement candidate. This allows any prior memory transactions to the evicted page pending in the master memory controllers to continue until the actual replacement occurs. The actual page replacement/writeback takes place when the page to be replaced reaches the head of the pending replacement page queue. The valid bit is marked false during the data transfer to prevent accidental page accesses from other processors.

Once the OS initiates a page swap, the OS can perform a context switch without waiting for the page swap to complete. The OS can use the existing policy to choose the victim memory page to be paged out, and the memory node co-memory controllers at the source and destination memory nodes perform the actual page swap using direct memory access between the two memory nodes. Once the page swap is complete, the subsequent accesses to the same page are served from the near memory, which significantly reduces memory access latency and improves system performance, Different page sizes are supported in the data management. While smaller pages (e.g., 64 KB) can reduce the memory page blocking time caused by page migration, large memory pages (e.g. 1 GB) can improve the performance of applications with good spatial locality.

Another example of a page management mechanism that may be implemented is a cache-style management mechanism for the near-far memory, where the near memory works as 'cache' for far memory nodes. In this example, there are two copies of "cached" memory pages in the same memory network, one in the near memory and one in the far memory. To some extent, the cache-style management mechanism is a variation of the example described above employing the "in-remote-memory" page fault, but trades memory capacity with system performance. Specifically, the cache-style management maintains two inclusive copies of the cached pages, thus reducing the total available memory capacity. On the other hand, when evicted from near memory, a clean cached page can simply be discarded rather than be sent back to far memory, which can save memory bandwidth and reduce memory blocking time due to page migration, and thus reduce memory latency and improve overall system performance. The same OS data structures (e.g. page table, address mapping, replacement page list, etc.) can be used in this example as well. The main difference is that a clean page is discarded without being written back to the far memory region Instead of memory page migration being performed on demand, as described in the examples above, another example of a page management mechanism proactively migrates pages between near and far memory. In a proactive hot-cold page management approach, memory page access patterns are monitored. The hot and cold pages are identified as the most recently used (MRU) and LRU pages in each monitored interval of execution. In a software based approach, the counters (i.e., a pseudo-LRU counter and a multi-queue counter used in modern processors) managed by OS are used to determine the LRU pages and MRU pages in near memory and far memory. The OS monitors the hot/cold page periodically, sends out swapping instructions for the near-cold and far-hot pages, and then updates the page table. The proactive hot-cold page management is especially effective for cases where memory accesses are not uniform to memory pages. The interval based proactive hot-cold page management can keep bring hot pages from remote memory and evict cold pages from near memory. The implementation of the on-demand page management mechanism can also be distributed and offloaded to the memory-side co-memory controllers, in the case in which they can autonomously issue memory accesses in the memory network, so that they can relieve the processor of some of the details of explicitly managing the page swaps.

Figure 5:
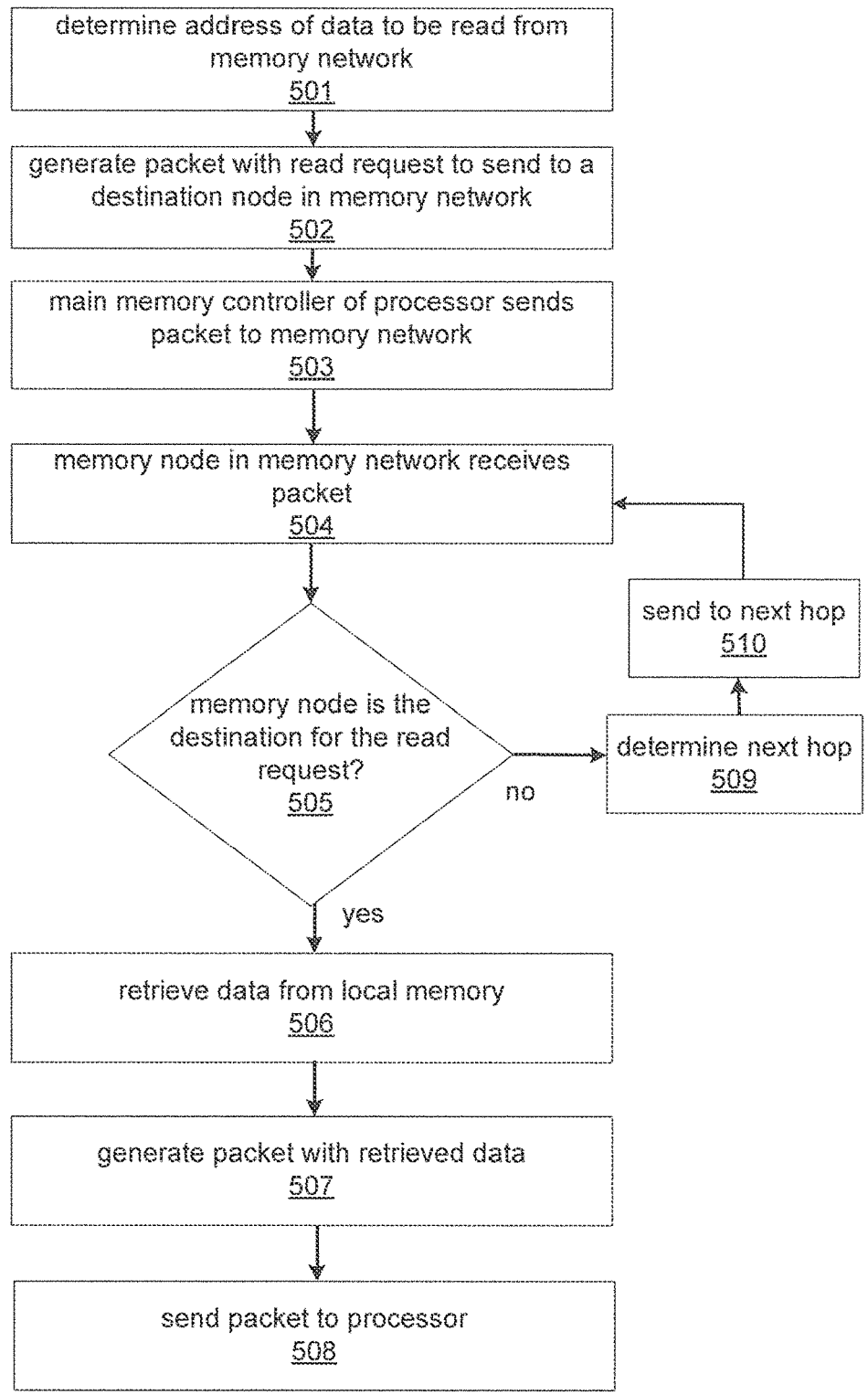
FIG. 5 illustrates a flow chart of a memory access in the memory network.

FIG. 5 illustrates a method 500 for performing a memory access in the memory network 100 according to an example. In this example, the memory access is for a read operation. At 501, a processor connected to the memory network 100, such as processor 110a shown in FIG. 1, determines an address of data to be read from the memory network 100. In one example, the address is an address in a global address space including all the memory locations in the memory network 100. If the processor 110a is using a page management mechanism incorporating near and far memory, such as described above, the page containing the desired data may be moved from far memory to near memory if it is in far memory.

At 502, the processor 110a generates a packet with a read request to send to a destination node in the memory network 100. The packet may include a source address of the processor 110a and a destination address and an indication that the packet is for a read operation. The packet may include the global address of the data to be read from the memory network 100. At 503, the memory controller 111a (e.g., main memory controller of processor 110a) sends the packet to a memory node in the memory network 100.

At 504, a memory node in the memory network 100 receives the packet. The routing logic 212 shown in FIG. 2 for the memory node 200 may send and receive packets in the memory network 100. At 505, the memory node determines whether it is the destination for the packet. For example, the memory node determines whether it stores data for the global address specified in the packet. The control logic 210 shown in FIG. 2 may include data storage storing the global addresses that are assigned to the memory node and any tables used for local memory accesses. The memory controller logic 211 may determine whether the memory node is assigned to the global memory address in the packet.

If the memory node the destination, at 506, the memory node may retrieve the data from its local memory to send to the processor 110a. For example, the memory controller logic 211 determines a local address of the memory 215 shown in FIG. 2 that corresponds to the global address in the packet, and retrieves the data from the local memory 215 to send to the processor 110a.

At 507, the memory controller logic 211 generates a packet with the retrieved data, and the routing logic 212 sends the packet to the processor 110a via the memory network 100 at 508.

At 509, if the memory node determines it is not the destination of the packet, the memory node determines a next hop for sending the packet. For example, the routing logic 212 may include a routing table that identifies a next hop based on a source and/or a destination address in the packet. Any routing protocol may be used. At 510, the memory node sends the packet to its next hop. The steps 509 and 510 may be repeated until the packet reaches its destination memory node in the memory network 100.

A write operation is similarly performed. After the data is written in local memory in a destination memory node, the memory node sends an acknowledgement to the processor requesting the write operation to indicate the data has been written to memory. In another example, the memory node writes data to its local memory without sending an acknowledgement to the processor, and the processor assumes the data is written reliably.

While the embodiments have been described with reference to examples, various modifications to the described embodiments may be made without departing from the scope of the claimed features.

What is claimed is:

1. A memory network comprising:
  memory nodes, wherein each memory node includes memory and control logic;
  inter-node point-to-point links connecting the memory nodes with each other; and
  a point-to-point link connecting a memory controller of a processor to one of the memory nodes, wherein the processor is configured to categorize addresses associated with the memory nodes as near memory or far memory according to latency or distance for memory accesses performed by the memory nodes for the processor and to determine whether data for a memory access to be performed is in an address of a near memory node or an address of a far memory node, and if the data is in a far memory node, to move the data to a near memory node to perform the memory access, and
  wherein the control logic of each memory node is configured to:
    perform a memory access that is invoked by the memory controller of the processor and route data or memory access commands to a destination in the memory network; and
    schedule execution of memory accesses with a same tagged priority level regardless of local memory device status to ensure that memory accesses with higher priorities are processed first; and
  wherein the control logic of each memory node and the memory controller of the processor are allowed to co-schedule memory requests to improve overall system performance.

2. The memory network of claim 1, wherein the control logic of a memory node of the memory nodes comprises:

memory controller logic to perform memory accesses on the memory for the memory node; and routing logic to receive a memory access command from the memory controller of the processor or another memory node, determine whether the memory node is the destination of the memory access command, and if the memory node is not the destination, forward the data or the memory access command to a next hop in the memory network toward the destination.

3. The memory network of claim 1, wherein the memory controller of the processor is configured to prioritize memory access requests destined for the memory nodes and to tag each memory access request with a priority, and the memory nodes are to execute the requested memory accesses according to their priorities.

4. The memory network of claim 1, wherein the control logic of a memory node is configured to schedule execution of memory accesses of memory requests from the memory controller of the processor according to local memory device status of the memory of the memory node.

5. The memory network of claim 1, wherein the processor is configured to swap data from the near memory node to a far memory node if there is insufficient capacity to store the data in the near memory.

6. The memory network of claim 1, wherein the processor is configured to predict future memory accesses and copy data for the predicted future memory accesses to a near memory node, wherein the data copied to the near memory node is also stored in a far memory node.

7. The memory network of claim 1, wherein the processor is configured to determine whether data in a near memory node is dirty during a near-far page swap, and wherein only dirty data pages are sent back to a far memory node when it is evicted from the near memory node.

* * * * *